US005724611A

United States Patent [19]
Evoy

[11] Patent Number: 5,724,611
[45] Date of Patent: Mar. 3, 1998

[54] AUTOMATIC CACHE CONTROLLER SYSTEM AND METHOD THEREFOR

[75] Inventor: David Ross Evoy, Tempe, Ariz.

[73] Assignee: VLSI Technology, Inc., San Jose, Calif.

[21] Appl. No.: 637,513

[22] Filed: Apr. 25, 1996

[51] Int. Cl.⁶ ............................................. G06F 13/00
[52] U.S. Cl. ....................... 395/848; 395/848; 364/707; 364/273.1
[58] Field of Search ........................... 395/750, 848; 364/273.1, 707

[56] References Cited

U.S. PATENT DOCUMENTS

| | | | |
|---|---|---|---|
| 5,163,153 | 11/1992 | Cole et al. | 395/750 |
| 5,175,845 | 12/1992 | Little | 395/550 |
| 5,204,964 | 4/1993 | Bowden, III et al. | 395/750 |
| 5,241,680 | 8/1993 | Cole et al. | 395/750 |
| 5,247,655 | 9/1993 | Khan et al. | 395/550 |
| 5,276,889 | 1/1994 | Shiraishi et al. | 395/750 |
| 5,355,503 | 10/1994 | Soffel et al. | 395/750 |
| 5,384,747 | 1/1995 | Clohset | 365/226 |
| 5,392,437 | 2/1995 | Matter et al. | 395/750 |
| 5,404,546 | 4/1995 | Stewart | 395/750 |
| 5,452,401 | 9/1995 | Lin | 395/750 |
| 5,504,907 | 4/1996 | Stewart et al. | 395/750 |
| 5,530,932 | 6/1996 | Carmean et al. | 395/750 |
| 5,603,037 | 2/1997 | Aybay | 395/750 |
| 5,619,729 | 4/1997 | Bland et al. | 395/848 |
| 5,630,146 | 5/1997 | Conary et al. | 395/750 |
| 5,648,799 | 7/1997 | Kikinis | 345/212 |

*Primary Examiner*—Jack B. Harvey
*Assistant Examiner*—Valerie Darbe
*Attorney, Agent, or Firm*—Harry M. Weiss; Jeffrey D. Moy; Harry M. Weiss & Associates, P.C.

[57] ABSTRACT

Signalling apparatus are used for monitoring a clock signal from a system controller to a processor. If the clock signal is low, indicating that the processor is disabled, the signalling apparatus will place the cache memory in a "sleep" mode. Thus, the signalling apparatus allow a computer system, upon which the signalling apparatus is a part of, to lower its power consumption. If the computer system is a portable computer system, the signalling apparatus will lower power consumption thereby extending the lifetime of the portable computer's batteries.

16 Claims, 1 Drawing Sheet

AUTOMATIC CACHE CONTROLLER SYSTEM AND METHOD THEREFOR

BACKGROUND OF THE INVENTION

1. Field of the Invention

This invention relates to cache controllers and, more specifically, to an automatic cache controller system which monitors the clock signal to the processor and sends a signal to enable or disable the cache memory based on the aforementioned clock signal.

2. Description of the Prior Art

In the past, the cache memory of a computer system was always left enabled when the computer system was operating. This is very undesirable for computer systems, specifically a portable computer system, since it is desirable to lower power consumption thereby maximizing the lifetime of the battery powering the portable computer system.

Recently, some of the newer cache Static Random Access Memory (SRAM) chips have been designed with a power down pin. The power down pin is generally referred to as a ZZZ pin. The ZZZ pin must be deasserted, low, prior to any access to the cache memory. The ZZZ pin can also be asserted, high, in order to disable the cache memory.

The problem with the ZZZ pin is that the cache memory requires an additional pin in order to place the cache memory in a "sleep" mode. Furthermore, the same signal which is used to disable the processor cannot be used to disable the cache memory. Processors generally require that the clock signal to the processor be restored for some interval prior to enabling the processor. This period is generally 1 millisecond for ×86 processors like the INTEL PENTIUM and 486 processors. In a typical power restoration operation, the clock signal is started and, after 1 millisecond of a stable clock signal, the STPCLK# input to the processor changes to high thereby enabling the processor. The STPCLK# signal cannot be used to enable and disable the cache memory for two reasons. First, the STPCLK# signal does not provide the necessary warning to the cache memory to allow the cache memory to be ready for processor access. Secondly, the polarity of the STPCLK# signal is wrong.

Therefore, a need existed to provide a system and method for monitoring the clock signal to the processor in order to enable and disable the cache memory. The system and method must be able to signal and enable the cache memory within 1 millisecond of the clock signal enabling the processor.

SUMMARY OF THE INVENTION

In accordance with one embodiment of the present invention, it is an object of the present invention to provide a system and method for monitoring the clock signal to the processor in order to enable and disable the cache memory.

It is another object of the present invention to provide a system and a method that is able to signal and enable the cache memory within 1 millisecond of the clock signal enabling the processor.

BRIEF DESCRIPTION OF THE PREFERRED EMBODIMENTS

In accordance with one embodiment of the present invention, an automatic cache controller system is disclosed. The system is comprised of a processor. System controller means are coupled to the processor for providing a clock signal to the processor when the processor is enabled and for stopping the clock signal to the processor when the processor is disabled. Cache memory means are coupled to the system controller means for storing information. Signalling means are coupled to the system controller means and to the cache memory means for monitoring the clock signal and for sending a signal to enable the cache memory means when the processor means is enabled and for sending a signal to disable the cache memory means when the processor is disabled. The signalling means is comprised of: a first resistor coupled to the system controller; a second resistor coupled to the system controller wherein the second resistor is of negligible resistance in relation to the first resistor; capacitor means coupled to the first resistor and to the second resistor for storing a charge to enable the cache memory means; and diode means for isolating the second resistor when the clock signal is stopped. Inverter means may also be provided. The invertor means are coupled to the capacitor means and are used for inverting the signal to activate and the signal to deactivate the cache memory means prior to sending each of the signals to the cache memory means.

In accordance with another embodiment of the present invention, a method of providing an automatic cache controller system is disclosed. The method comprises the steps of: providing a processor; providing system controller means coupled to the processor for providing a clock signal to the processor when the processor is enabled and for stopping the clock signal to the processor when the processor is disabled; providing cache memory means coupled to the system controller means for storing information; and providing signalling means coupled to the system controller means and to the cache memory means for monitoring the clock signal and for sending a signal to enable the cache memory means when the processor is enabled and for sending a signal to disable the cache memory means when the processor is disabled. The step of providing signalling means further comprises the steps of: providing a first resistor coupled to the system controller; providing a second resistor coupled to the system controller wherein the second resistor is of negligible resistance in relation to the first resistor; providing capacitor means coupled to the first resistor and to the second resistor for storing a charge to enable the cache memory means; and providing diode means for isolating the second resistor when the clock signal is stopped. The method may further comprise the step of providing inverter means coupled to the capacitor means for inverting the signal to activate and the signal to deactivate the cache memory means prior to sending the signals to the cache memory means.

DETAILED DESCRIPTION OF THE PREFERRED EMBODIMENT

Figure 1:
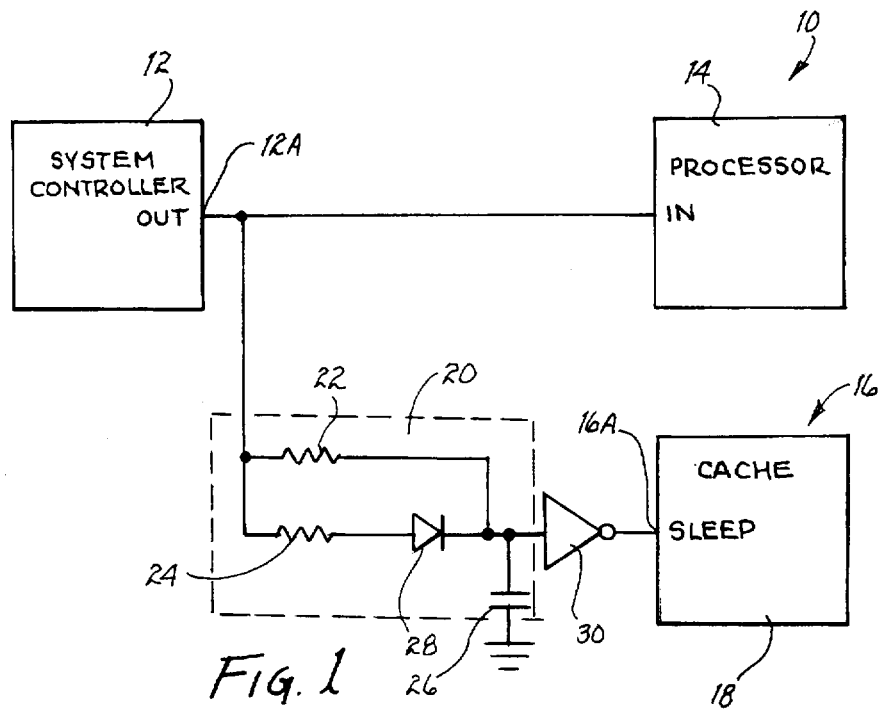
FIG. 1 is a simplified block diagram of the automatic cache controller system of the present invention.

Referring to FIG. 1, an automatic cache controller system 10 (hereinafter system 10) is shown. The system 10 is comprised of a system controller 12 which is coupled to a processor 14. The system controller 12 is used for providing a clock signal to the processor 14 whenever the processor 14 is enabled. If the processor 14 is disabled by a STPCLK# signal or by some other means, the system controller 12 will stop sending the clock signal to the processor 14. The system controller 12 will not resume sending the clock signal to the processor 14 until the processor 14 has been reenabled.

A cache memory 16 is coupled to an output 12A of the system controller 12. The cache memory 16 is generally used for storing information in the computer system. In the preferred embodiment of the present invention, the cache memory 16 is comprised of Static Random Access Memory (SRAM) chips 18.

A signalling means 20 is coupled between the output 12A of the system controller 12 and an input 16A to the cache memory 16. The signalling means 20 is used for monitoring the clock signal outputted from the system controller 12 to the processor 14. If the clock signal is high, indicating that the processor 14 is enabled, the signalling means 20 will send a signal to enable the cache memory 16. If the clock signal to the processor 14 is low, indicating that the processor 14 is disabled, the signalling means 20 will send a signal to disable the cache memory 16.

The signalling means 20 are comprised of a pair of resistors 22 and 24 which are coupled to the output 12A of the system controller 12. The resistor 22 is generally of a value substantially greater than that of the resistor 24. In the preferred embodiment of the present invention, the resistor 22 has a value of one (1) mega (M) ohm, and the resistor 24 has a value of four (4) kilo (k) ohms. A capacitor 26 is coupled to the pair of resistors 22 and 24. The capacitor 26 is used for storing a charge which is used to enable the cache memory 16. In the preferred embodiment of the present invention, the capacitor 26 has a value of twenty (20) pico (p) farads. A diode 28 is coupled between the resistor 24 and the capacitor 26. The diode 28 is used for isolating the resistor 24 when the clock signal from the system controller 12 to the processor 14 is low.

As stated above, the cache memory 16 is generally comprised of SRAM chips 18. Some of the newer SRAM chips 18 have a power down pin generally referred to as a ZZZ pin. In order to access the SRAM chips 18, the ZZZ pin needs to be deasserted (i.e., a low signal needs to be sent to the ZZZ pin). If the SRAM chips 18 are to be placed in a disabled state, the ZZZ pin is asserted (i.e., a high signal is sent to the ZZZ pin). Since the ZZZ pin operates on a polarity opposite to that of the clock signal from the system controller 12 to the processor 14, an inverter 30 is coupled between the signalling means 20 and the cache memory 16. The inverter 30 is used for inverting the signal to activate and the signal to deactivate the cache memory 16 prior to sending the signals to the cache memory 16.

OPERATION

Figure 2:
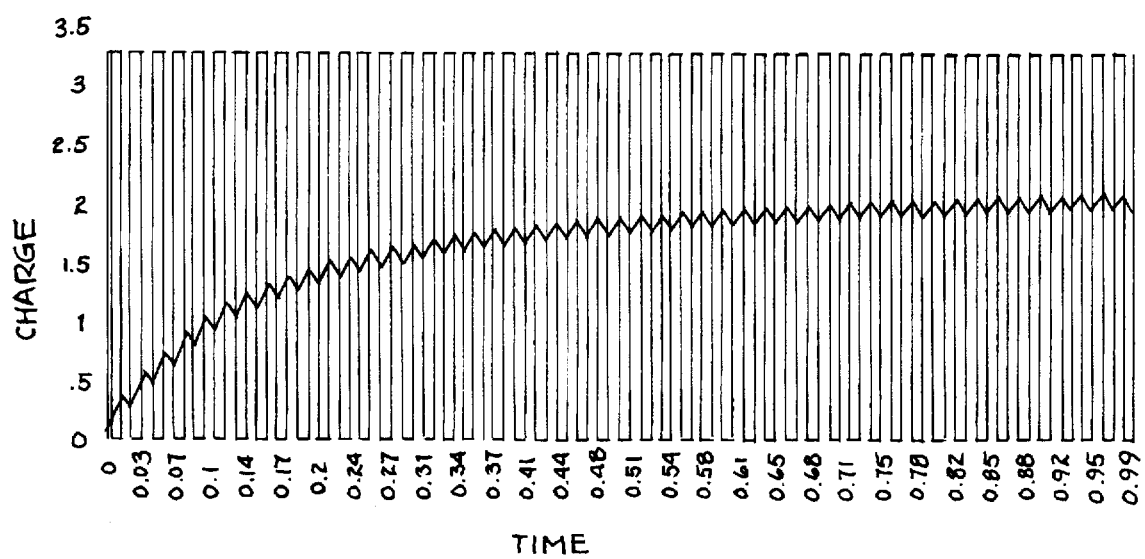
FIG. 2 is a timing diagram showing the charge rate of the system depicted in FIG. 1.

FIG. 2 is a charge waveform showing the start-up waveform at the capacitor 26. The charge waveform of FIG. 2 is based on the preferred embodiment of the present invention (i.e., resistor 22 having a value of 1M ohm, resistor 24 having a value of 4 k ohms, and the capacitor 26 having a value of 20 p farads). As can be seen, the signalling means 20 produces a high signal output in approximately 0.5 μsec. The charge time of the system 10 is controlled by the resistor 24, the diode 28, and the capacitor 26. When the clock signal from the system controller 12 to the processor 14 is high, the clock signal also passes through the resistor 24, the diode 28 and charges the capacitor 26. The resistor 22 is so large as compared to the resistor 24 that the resistor 22 has very little impact on the charge time of the capacitor 26. When the capacitor 26 reaches a high value, the inverter 30 inverts the signal from the capacitor 26 and sends a low signal to the cache memory 16 thereby enabling the cache memory 16.

When the clock signal from the system controller 12 to the processor 14 is low, the signalling means 20 will disable the cache system 16. The disable time is controlled by the capacitor 26 being discharged by the resistor 22. Note, the diode isolates the resistor 24 during clock off times.

While the invention has been particularly shown and described with reference to a preferred embodiment thereof, it should be understood by those skilled in the art that changes in form and detail may be made therein without departing from the spirit and scope of the invention.

I claim:

1. An automatic cache controller system comprising, in combination:

a processor;

system controller means coupled to said processor for providing a clock signal to said processor when said processor needs to be enabled and for stopping said clock signal to said processor when said processor needs to be disabled;

cache memory means coupled to said system controller means for storing information; and signalling means coupled to said system controller means and to said cache memory means for monitoring said clock signal and for sending a signal to enable said cache memory means when said processor is enabled and for sending a signal to disable said cache memory means when said processor is disabled.

2. An automatic cache controller system in accordance with claim 1 wherein said signalling means comprises:

a first resistor coupled to said system controller;

a second resistor coupled to said system controller;

capacitor means coupled to said first resistor and to said second resistor for storing a charge to enable said cache memory means; and diode means for isolating said second resistor when said clock signal is stopped.

3. An automatic cache controller system in accordance with claim 2 further comprising inverter means coupled to said capacitor means for inverting said signal to activate and said signal to deactivate said cache memory means prior to sending each said signal to said cache memory means.

4. An automatic cache controller system in accordance with claim 2 wherein said second resistor is of negligible resistance in relation to said first resistor.

5. An automatic cache controller system in accordance with claim 2 wherein said first resistor has a value of about 1 mega (M) ohm and said second resistor has a value of about four kilo (k) ohms.

6. An automatic cache controller system in accordance with claim 2 wherein said capacitor means has a value of about 20 pico farads.

7. An automatic cache controller system comprising, in combination:

a processor;

system controller means coupled to said processor for providing a clock signal to said processor when said processor needs to be enabled and for stopping said clock signal to said processor when said processor needs to be disabled;

cache memory means coupled to said system controller means for storing information;

signalling means coupled to said system controller means and to said cache memory means for monitoring said clock signal and for sending a signal to enable said cache memory means when said processor is enabled and for sending a signal to disable said cache memory means when said processor is disabled, said signalling means comprises:

a first resistor coupled to said system controller;

a second resistor coupled to said system controller;

capacitor means coupled to said first resistor and to said second resistor for storing a charge to enable said cache memory means;

diode means for isolating said second resistor when said clock signal is stopped; and inverter means coupled to said capacitor means for inverting said signal to activate and said signal to deactivate said cache memory means prior to sending each said signal to said cache memory means.

8. An automatic cache controller system in accordance with claim 7 wherein said second resistor is of negligible resistance in relation to said first resistor.

9. An automatic cache controller system in accordance with claim 7 wherein said first resistor has a value of about 1 mega (M) ohm and said second resistor has a value of about four kilo (k) ohms.

10. An automatic cache controller system in accordance with claim 7 wherein said capacitor means has a value of about 20 pico farads.

11. A method of providing an automatic cache controller system comprising the steps of:

providing a processor;

providing system controller means coupled to said processor for providing a clock signal to said processor when said processor needs to be enabled and for stopping said clock signal to said processor when said processor needs to be disabled;

providing cache memory means coupled to said system controller means for storing information; and providing signalling means coupled to said system controller means and to said cache memory means for monitoring said clock signal and for sending a signal to enable said cache memory means when said processor is enabled and for sending a signal to disable said cache memory means when said processor is disabled.

12. The method of claim 11 wherein said step of providing signalling means further comprises the steps of:

providing a first resistor coupled to said system controller;

providing a second resistor coupled to said system controller;

providing capacitor means coupled to said first resistor and to said second resistor for storing a charge to enable said cache memory means; and providing diode means for isolating said second resistor when said clock signal is stopped.

13. The method of claim 12 further comprising the step of providing inverter means coupled to said capacitor means for inverting said signal to activate and said signal to deactivate said cache memory means prior to sending said signals to said cache memory means.

14. The method of claim 12 wherein said step of providing a second resistor further comprises the step of providing said second resistor wherein said second resistor is of negligible resistance in relation to said first resistor.

15. The method of claim 12 wherein said steps of providing a first resistor and a second resistor further comprises the steps of providing said first resistor having a value of about 1 mega (M) ohm and providing said second resistor having a value of about four kilo (k) ohms.

16. The method of claim 12 wherein said step of providing capacitor means further comprises the step of providing said capacitor means having a value of about 20 pico farads.

* * * * *